Sept. 27, 1932.   R. C. PIERCE   1,879,466
ARTICLE MADE OF WIRE AND PROCESS OF MAKING THE SAME
Filed March 27, 1930
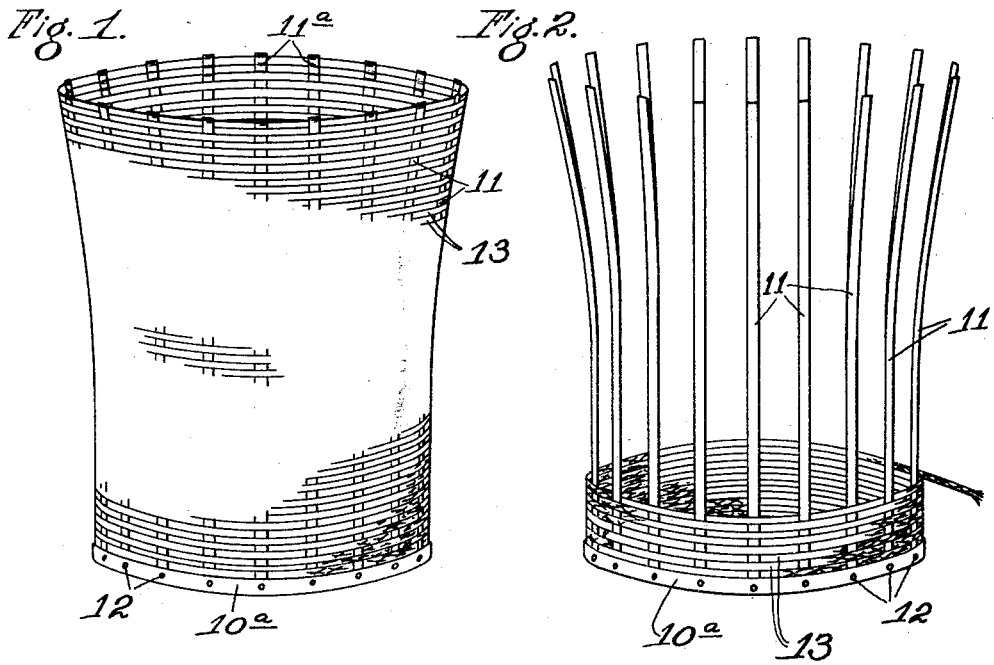
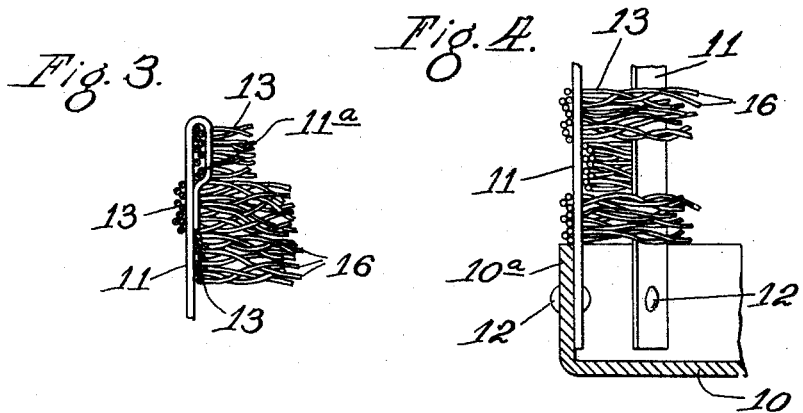
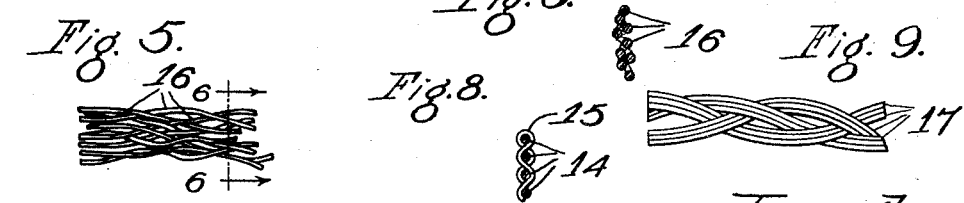
Inventor.
Robert C. Pierce.
By Dyrenforth, Lee, Chritton and Wiles
Attys.

Patented Sept. 27, 1932

1,879,466

UNITED STATES PATENT OFFICE

ROBERT C. PIERCE, OF NILES, MICHIGAN, ASSIGNOR TO NATIONAL-STANDARD COMPANY, OF NILES, MICHIGAN, A CORPORATION OF MICHIGAN

ARTICLE MADE OF WIRE AND PROCESS OF MAKING THE SAME

Application filed March 27, 1930. Serial No. 439,515.

This invention relates to improvements in articles made of wire and process of making the same; and has a practically unlimited application. It may be used, for example, in the making of furniture, baskets, lamp shades, screens, coffins, boxes, receptacles, and containers of all kinds. It may also be used in the making of shallow dish-like receptacles, trays, and the like. For example, flat sheets may be formed with more or less upwardly turned or formed edges to make trays and similar articles.

Merely for the purpose of illustration, and without intending to limit the uses of the invention, I have here shown it as embodied in a receptacle, which, for example, may be a waste-basket.

Among the features of my invention is the provision of such an article that may be easily and cheaply made and which is light in weight, yet strong and durable.

Another feature of my invention is, that the article may be made entirely of metal. This is especially desirable, for example, in connection with waste-baskets and the like, where it is especially desirable that the same be fireproof.

By the use of my invention, the appearance of the article is naturally enhanced, and its completed texture permits the use of a wide variety of decorative effects with the use of paints, enamels, lacquers, and metallic powders. I have found that completed articles made according to my invention lend themselves admirably to the production thereon of delicate shadings of color and metallic tints.

By the use of my invention a very close mesh or weave is permitted so that the completed article, even though made principally of wire, may have a wall with only very small interstices.

Other features and advantages of my invention will appear more fully as I proceed with my specification.

In that form of article, a waste-basket, embodying the features of my invention shown in the accompanying drawing, Fig. 1 is a view in perspective showing the same completed; Fig. 2 is a similar view before completion; Fig. 3 is a vertical sectional view showing the side wall at the top; Fig. 4 is a similar view at the bottom; Fig. 5 is a plan view of one kind of wire tape that can be used in making the article; Fig. 6 is a sectional view of the tape shown in Fig. 5, Fig. 7 is a plan view of another kind of tape, Fig. 8 is a sectional view of the tape shown in Fig. 7, and Fig. 9 is a plan of another tape.

In the practice of my invention there is first made a braided wire tape as shown in Figs. 5 and 6, or a woven wire tape as shown in Figs. 7 and 8. Although either kind of tape is adapted for use in carrying out my invention, I at present prefer the braided tape. Both forms of tape shown are well known in another and unrelated art, the same being used as tire bead reenforcing elements. The wires may be braided in any manner desired to form a flat tape or ribbon. For example, a braided wire tape is shown in U. S. patents: Pierce—1,703,593—Feb. 26, 1929, Pierce—1,670,044—May 15, 1928, and a woven tape is shown in U. S. patents: Pierce—1,595,313—Aug. 10, 1926, Pierce—1,512,794—Oct. 21, 1924, Pierce—1,512,795—Oct. 21, 1924, Pierce—1,512,796—Oct. 21, 1924.

Such tapes are very rapidly and cheaply made on machines especially designed for the purpose; and may have practically any desired width. It is quite common to make them from one-eighth to one-half inch wide. I have found that tapes of approximately such widths are very well suited to the practice of my invention. By employing a tape of the kind described having a plurality of wires therein the weaving of a completed article may be accomplished much more rapidly than by the use of a single wire. Completed articles of the kind referred to, because of inherent difficulties and the great variety of shapes and sizes required, cannot readily be made on machines. When such articles are made up from a single wire by hand, however, the operation is long and expensive. The wire tape, however, may be very rapidly and cheaply produced on automatic weaving and braiding machines. Such completed tape will lend itself to the production of articles of various shapes and sizes which may be very quickly and cheaply woven therefrom by hand.

In making a basket as shown, the bottom, as indicated by 10, may be made out of sheet metal and provided with an upstanding flange 10ª to which may be attached the staves or uprights 11, here shown as strips of sheet metal, the same being fastened to the flange 10ª at their lower ends by the rivets 12.

In Figs 1 to 4, inclusive, 13 is used to indicate in general the wire tape which may be either braided as shown in Figs. 5 and 6 or woven as indicated in Figs. 7 and 8. This tape is woven, for example, by hand, with the staves 11 as shown in Fig. 2 by passing the same alternately inside and outside of the staves around and around until the wall is completely built up. The tops of the staves 11ª may be bent over the upper strand of the tape as shown in Fig. 3 to hold the same securely.

The tape shown in Figs. 5 and 6 is a braided tape which may, for example, be about one-eighth of an inch wide. The same is here shown as being formed of nine separate wires 16, 16, braided together.

The tape shown in Figs. 7 and 8 is a woven tape consisting of wires 14, 14, in substantially parallel relationship held together by a preferably smaller and softer wire 15 woven back and forth as shown.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible, in view of the prior art.

The tape shown in Fig. 9 is a braided tape made up of three groups of three wires each, the wires being indicated by 17.

What I regard as new, and desire to secure by Letters Patent, is:

1. An article of manufacture having a body comprising staves, and a strand of metallic tape woven spirally about said staves providing a selvage edge in substantially a single plane, said strand consisting of a multiplicity of wires enabling the same to be transversely contracted so that the aforesaid selvage may be formed and means whereby the staves maintain the tape in position providing said selvage edge.

2. An article of manufacture having a body comprising staves, and a strand of metallic tape woven spirally about said staves providing a selvage edge in substantially a single plane, said strand consisting of a multiplicity of braided wires enabling the same to be transversely contracted so that the aforesaid selvage may be formed and means whereby the staves maintain the tape in position providing said selvage edge.

3. An article of manufacture having a body comprising staves, and a strand of metallic tape woven spirally about said staves providing a selvage edge in substantially a single plane, said strand consisting of a multiplicity of braided wires enabling the same to be transversely contracted so that the aforesaid selvage may be formed, the ends of the staves being returned and in folded engagement with the tape at said selvage edge.

4. An article of manufacture having a body comprising staves, and a strand of metallic tape woven spirally about said staves providing a selvage edge in substantially a single plane, said strand consisting of a multiplicity of braided wires enabling the same to be transversely contracted so that the aforesaid selvage may be formed, the ends of the staves being returned and in folded engagement with the tape at said selvage edge, certain of the returned portions being on the opposite side of the tape to the other returned portions.

In witness whereof, I have hereunto set my hand this 24th day of March, 1930.

ROBERT C. PIERCE.